United States Patent [19]

Gillespie

[11] 4,240,313

[45] Dec. 23, 1980

[54] ROTARY CUTTING KNIFE MOUNTING

[75] Inventor: Andrew J. Gillespie, Richmond, Va.

[73] Assignee: Philip Morris Incorporated, New York, N.Y.

[21] Appl. No.: 967,782

[22] Filed: Dec. 8, 1978

[51] Int. Cl.[3] .............................................. B23D 25/00

[52] U.S. Cl. ....................................... 83/343; 83/348; 83/674; 83/677; 83/700; 83/346

[58] Field of Search ................. 83/346, 347, 663, 674, 83/677, 344, 348, 662, 700, 343; 51/238 GG; 144/230

[56] References Cited

U.S. PATENT DOCUMENTS

| | | | |
|---|---|---|---|
| 272,354 | 2/1883 | Titus | 83/346 |
| 1,006,783 | 10/1911 | Paquin | 83/344 |
| 1,825,069 | 9/1931 | Kavle | 83/346 |
| 2,011,611 | 8/1935 | Blum | 83/662 |
| 2,939,356 | 6/1960 | Tracy | 83/346 |
| 3,340,757 | 9/1967 | Rudszinat | 83/674 |

FOREIGN PATENT DOCUMENTS

| | | | |
|---|---|---|---|
| 934295 | 8/1963 | United Kingdom | 83/348 |

*Primary Examiner*—Harold D. Whitehead
*Assistant Examiner*—K. Bradford Adolphson
*Attorney, Agent, or Firm*—Watson, Leavenworth, Kelton & Taggart

[57] ABSTRACT

The knives of a rotary cutter assembly are mounted on a centrally disposed pivot and elastic means are used to apply bias force to the knife ends to normally maintain the cutting edges of the knives substantially parallel with the axis about which the rotary cutter assembly rotates, the mounting being such to allow the knives to pivot when contacting the surface of a rotary drum against which they operate to assure that the cutting edges are parallel to the drum surface during the actual cutting through of a material web passing in a winding course on the drum. Additionally, means for adjusting the radial positioning of the pivots relatively of the said cutter assembly axis of rotation are included and means for locking the pivots in a particular position are also included.

9 Claims, 4 Drawing Figures

ROTARY CUTTING KNIFE MOUNTING

BACKGROUND OF THE INVENTION

Various forms of apparatus are known for sectioning a continuous web of material. A particular utilization of such apparatus involves the sectioning of cigarette tipping paper. The tipping paper is fed around a rotating drum and sectioned thereon by means of a rotary cutter assembly mounting a plurality of cutting knives which strike the continuous web against the rotary drum to effect the sectioning of the tipping paper. One such apparatus is that disclosed in pending application Ser. No. 941,497 filed Sept. 11, 1978, the disclosure of which is herein incorporated by reference.

One of the considerations in such apparatus is the necessity for maintaining the cutting edge of the respective cutting knife substantially parallel to the axis about which the rotary cutter assembly rotates to ensure that double cutting of the web is avoided.

SUMMARY OF THE INVENTION

The present invention is concerned with an improved form of rotary cutter assembly which is used in conjunction with a rotary drum to effect sectioning of a web material which passes on to the drum during rotation of the same, the rotary cutter assembly rotating about an axis which is parallel to the rotary drum axis of rotation.

In accordance with the invention, each of the plurality of elongated cutting knives which are carried in the housing of the rotary cutter assembly is mounted on a pivot in the housing and adjustable elastic means are provided for engagement with the ends of each knife to normally apply bias force to the knife to maintain the cutting edge thereof parallel with the fixed axes about which the drum and cutter assembly rotate. The elastic means has two functions, one to hold the blade in the housing in a manner as prevents any displacement thereof by centrifugal force during the rotation of the assembly and also to position the blade cutting edge such that it is in a true parallel contact course with the drum during the actual cutting of the web.

The invention further provides that the pivots upon which the cutting knives are mounted are adjustably carried in the housing and can be adjusted radially relatively of the axis of rotation for fixing the distance of the cutting edge of each of the respective knives at the same radial measurement from the cutter assembly axis of rotation. In preferred form, the pivots are adjustable screw members with the housing having threaded passages which receive the screw members. For the purpose of effecting adjustment of the pivots, access passages are provided in the housing and communicate with the threaded passages mounting the pivots so that there is thus provided means for effecting adjustment by inserting a tool into the access passage from an entry location thereto which is disposed diametrically opposed to the location in the housing of the associated screw members.

The invention also provides means for locking the adjustable screw members in the housing, such means desirably taking the form of a locking pin which has a threaded tip end engageable with the threads on the adjustable screw member and further including means for urging the locking pin tip end into binding engagement with the screw member, such urging means being in the form of a set screw engaging the opposite tip end of the locking pin.

The elastic means which are employed for applying bias to the cutting knives desirably is provided in the form of adjustable ball plunger units carried on a ring at the ends of the housing, with the ball plunger units engaging longitudinal extensions at the ends of the cutting knives.

The invention accordingly comprises the rotary cutter assembly improvements possessing the features, properties and relation of elements which will be exemplified in the device hereinafter described and the scope of the invention will be indicated in the claims.

BRIEF DESCRIPTION OF THE DRAWINGS

Other objects of the invention will be in part obvious and will in part appear from the following detailed description taken in conjunction with the accompanying drawings wherein like reference numerals identify like parts throughout and in which.

DESCRIPTION OF THE PREFERRED EMBODIMENTS

Figure 1:
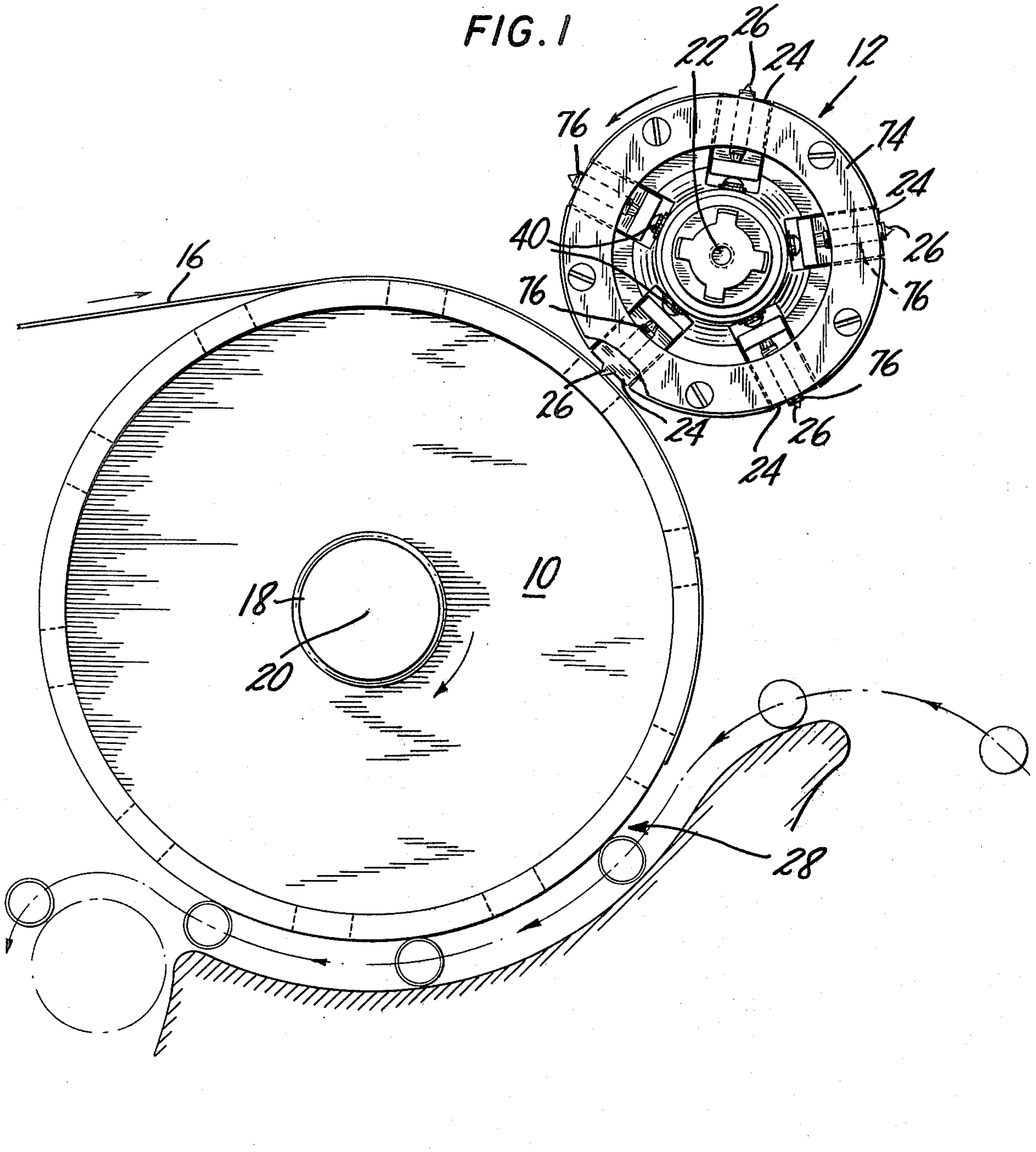
FIG. 1 is an end elevation view of a rotary drum and rotary cutter assembly, the latter embodying improvements of the present invention, there being shown a web passing between the cutter assembly in a winding course about the drum for sectioning of the web into lengths of predetermined dimension, the particular embodiment depicted being that associated with the sectioning of cigarette tipping paper.

Referring to FIG. 1, there is depicted a rotary drum 10 and rotary cutter assembly 12 of the type employed and disclosed in pending application Ser. No. 941,497. In particular, the rotary cutter assembly 12 is modified as will be described hereinafter in respect of the manner in which the cutting knives are mounted in the housing component 14 of the rotary cutter assembly.

With reference again to FIG. 1, the rotary drum 10 or "cork" drum as it is commonly known in the tobacco industry serves to receive thereon a continuous web 16 of tipping paper which transits a winding course about the cork drum, the drum having a central shaft 18, the axis 20 of which is parallel to the axis 22 about which the rotary cutter assembly 12 rotates. The rotary cutter assembly as will be noted, includes a plurality of cutting knives 24 which are elongated and desirably present cutting edge surfaces as, for example, 26 which normally are disposed parallel to the respective axes of rotation of the drum and cutter assembly. The cutting edges 26 of the knives are, it will be understood, brought into contact with the surface of the drum as they cut through the continuous web when sectioning same. Following the sectioning operation, the respective individual lengths of the tipping paper are retained on the rotary drum 10 by vacuum means and brought into cooperative relationship with tobacco cylinders and a dual filter plug (depicted generally at 28) in known manner and as, for example, described in detail in application Ser. No. 941,497.

Figure 2:
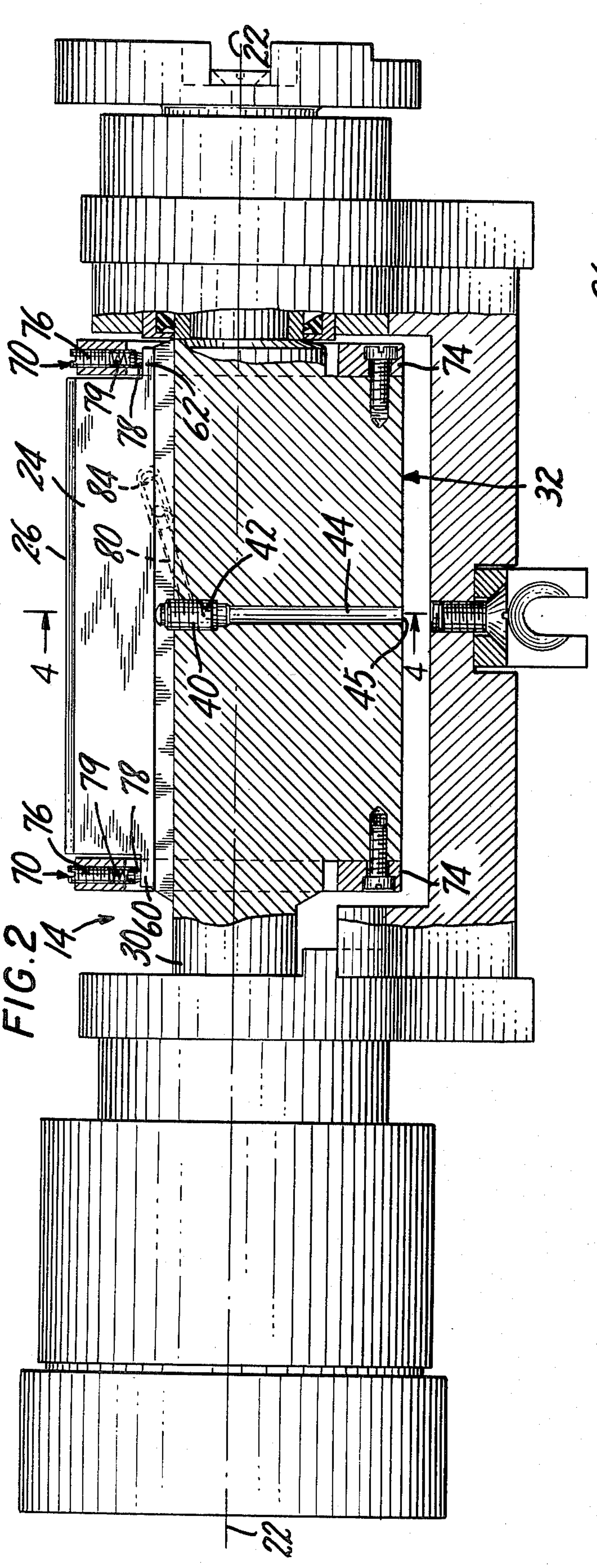
FIG. 2 is a longitudinal sectional view of the rotary cutter assembly showing the manner in which the elongated cutting knives are mounted on pivots therein, portions of the cutter assembly being shown in section for purposes of delineating the constructional details thereof.
Figure 4:
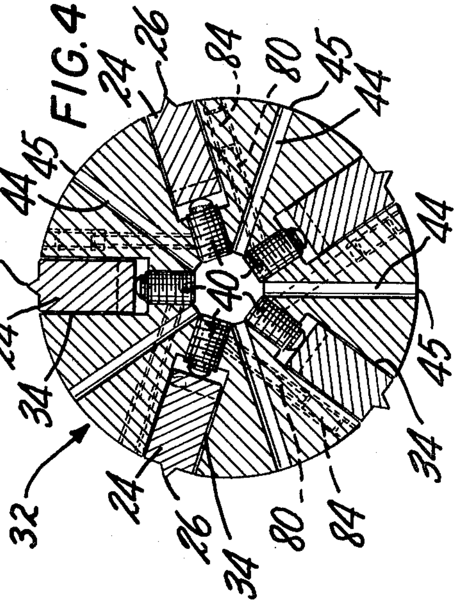
FIG. 4 is a sectional view of the rotary cutter assembly housing component in which the cutting knives are received and depicting the slot arrangement in which the cutting knives are actually received, and further the access passages by means of which the pivot positioning in the housing can be adjusted.

The present invention is particularly concerned with improvements in the rotary cutter assembly 12 and more particularly in the manner in which the elongated cutting knives 24 are mounted therein. With reference now to FIG. 2, the rotary cutter assembly 12 includes a housing component depicted generally at 30 which is of elongated character and includes a central enlarged segment 32 which is longitudinally slotted as with slots 34 (FIG. 4) in which are received the respective ones of the cutting knives 24.

For the purposes of mounting the cutting knives 24 in the slots, there are provided pivots 40 associated with each of the cutting knives, the pivots desirably being in the form of screw members each of which is received in a threaded passage 42 formed within the central segment portion 32 of the housing member. The screw thread pivots are adjustable radially of the axis of rotation of the cutter assembly and can be adjusted to present the cutting edges 26 of the knives at the same distance from said axis 22 to attain a distance to be that which maintains the timing of the knives to the drum to insure the proper length of tipping paper between cuts. The depth of cut, or more accurately, the interference between the knives and cork drum is accomplished by housing the entire knife holder in a housing which is eccentric to the true centerline of the knife holder and by rotating the knife holder in another housing that the knife edges are moved closer or further to the drum surfaces. To effect adjustment of the pivots which are disposed such that they support the cutting knives at mid-length thereof, the housing is provided with access passages 44 which have entry thereto at locations on apertures 45 diametrically opposed to the locations of the pivots in the housing. For effecting adjustment, a tool such as an Allen wrench can be inserted in the access passage and the radial positioning of the pivot in the housing altered accordingly.

The invention also provides that the cutting knives have extensions at the opposite ends thereof as at 60, 62 which are engaged by adjustable elastic means 70 which normally apply a biasing force to each cutting knife to maintain the cutting edge 26 thereof substantially parallel to the axis 22 about which the cutter assembly rotates. Such elastic means are in preferred form, ball plunger members which are fixed to rings 74 at each end of central segment 32 and which in turn are secured to opposite ends of the segment. Each ball plunger includes an adjustment screw spring component 76, a spring member 79 and a ball member 78, the last-mentioned actually engaging the extensions 60, 62 of the cutting knife. The employment of such units allows for applying unequal biasing forces to the respective extensions 60, 62 if necessary to effect the proper alignment of the knife cutting edge.

It will be seen then that the knife plate is supported in the holder by a single point acting as a pivot point. Thus if it is necessary for the blade to pivot to correct for any misalignment between the cork drum and the knife holder, this readily is accomplished by means of pivoting of the blade and the return of the blade to its normal position following the actual cutting operation in which its cutting edge is parallel to the axis of cutter assembly rotation by reason of the operation of the ball plunger members. While the ball plunger maintains the cutting edge normally parallel with the axis about which the cutter assembly rotates, it will be appreciated that if there is any surface imperfections in the rotary drum, or reason which causes the axes of rotation of the cutter assembly and cork drum not to be parallel, e.g., worn bearings, the mounting provided by the present invention allows the knife to pivot to present a true parallel cutting edge contact with the drum and thus substantially since all knives are of the same distance from axis 22, there is less interference with the cork drum surface and therefore less force on the cutting edges 26 which results in enhanced or longer service life of the cutting knife.

Figure 3:
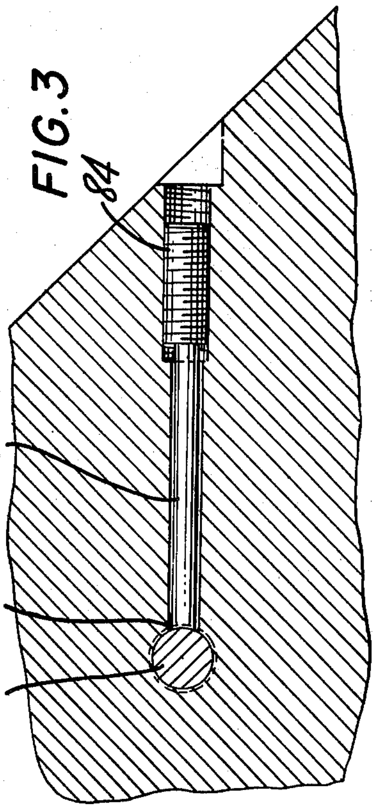
FIG. 3 is a fragmentary sectional view depicting the locking means by which the pivots can be locked in a specific positioning within the housing.

After the screw members 40 have been properly positioned in the housing central segment 32, it is desirable that the pivots be locked in place. For this purpose and as shown in greater detail in FIG. 3, there is provided locking means which engages with the pivot 40 to hold it in a fixed radial position relatively of the axis of rotation of the cutter assembly. Such means includes a locking pin or rod 80 which is threaded at one tip end as at 82 in conformance with the threads on the screw member 40. The rod or locking pin in turn is engaged at its other end by set screw 84 which is used to apply force to effect binding engagement of the screw threaded tip end of rod 80 with the screw member 40 thus to lock it securely in place within the passage 42. It will be understood that the threads at tip end 82 are always in mesh with the threads on the pivots 40 but function to lock the pivots only when binding force is established between the respective threaded surfaces.

While there is disclosed but certain embodiments of the improvements of the present invention, it will be apparent that certain modifications can be made therein within the scope of the invention herein disclosed.

What is claimed is:

1. Improved apparatus for sectioning a continuous web of the type having:
   - a rotary drum over which the web passes in a winding course thereon, and
   - a rotary cutter assembly including a housing and a plurality of cutting knives carried in said housing, the rotary drum and the cutter assembly being rotatable about parallel axes, the knives on said cutter assembly being elongated and having cutting edges thereof which are disposed parallel to said axes of rotation, said cutting edges being brought into contact with the surface of said rotary drum to effect sectioning of said web thereon during rotation of said rotary drum and said cutter assembly, wherein the improvement comprises:
   - pivots carried in said housing in a number corresponding to the number of cutting knives in the plurality, each knife being received on an associated one of said pivots, and
   - elastic means engaged with the ends of each such knife and normally applying bias directed radially inwardly of said cutter assembly to each such knife to maintain the cutting edge thereof parallel to said fixed axes and to urge each such knife against the associated pivot.

2. The apparatus of claim 1 in which said pivots are adjustably carried in said housing, said pivots being adjustable radially relatively of the axis of rotation of said cutter assembly.

3. The apparatus of claim 2 in which said pivots are adjustable screw members, the housing having threaded passages receiving each screw member.

4. The apparatus of claim 3 in which said housing is provided with access passages communicating with said threaded passages for effecting adjustment of said screw members, entry to said access passages being at locations diametrically opposed to the location of the associated screw members.

5. The apparatus of claim 1 in which each knife is received on its associated pivot at substantially mid-length of the knife.

6. The apparatus of claim 3 further comprising means for locking said adjustable screw members in said housing.

7. The apparatus of claim 6 in which said locking means includes a locking pin having a threaded tip end engageable with the threads on the adjustable screw members and means bringing said locking pin tip end into binding engagement with the screw member.

8. The apparatus of claim 1 in which said elastic means comprises ball plunger units carried on said housing, each knife having longitudinal extensions at the ends thereof, the ball plunger units engaging said extensions.

9. The apparatus of claim 8 in which said elastic means are adjustable to apply greater and/or lesser elastic bias to the said end extension.

* * * * *